(12) United States Patent
Krygier et al.

(10) Patent No.: US 7,641,121 B2
(45) Date of Patent: Jan. 5, 2010

(54) MULTI-PROTOCOL MEMORY CARD

(75) Inventors: Marcelo Krygier, Kyriat Ono (IL); Moshe Meyassed, Kadima (IL); Elad Amir, Hadera (IL)

(73) Assignee: Qimonda AG, Munich (DE)

( * ) Notice: Subject to any disclaimer, the term of this patent is extended or adjusted under 35 U.S.C. 154(b) by 266 days.

(21) Appl. No.: 10/546,938

(22) PCT Filed: Feb. 25, 2004

(86) PCT No.: PCT/IL2004/000190

§ 371 (c)(1),
(2), (4) Date: Jan. 25, 2007

(87) PCT Pub. No.: WO2004/077335

PCT Pub. Date: Sep. 10, 2004

(65) Prior Publication Data

US 2007/0170266 A1 Jul. 26, 2007

Related U.S. Application Data

(63) Continuation of application No. 10/372,304, filed on Feb. 25, 2003, now abandoned.

(51) Int. Cl.
*G06K 19/06* (2006.01)
(52) U.S. Cl. .................................. 235/492; 235/440
(58) Field of Classification Search ............ 235/492, 235/440
See application file for complete search history.

(56) References Cited

U.S. PATENT DOCUMENTS

| 6,669,487 | B1 | 12/2003 | Nishizawa et al. |
| 2002/0111771 | A1 | 8/2002 | Huang et al. |
| 2003/0046472 | A1 | 3/2003 | Morrow |
| 2007/0175994 | A1* | 8/2007 | Fruhauf ............ 235/440 |

FOREIGN PATENT DOCUMENTS

| WO | WO 99/49415 A2 | 9/1999 |
| WO | WO 02/13021 | 2/2002 |
| WO | WO 02/31762 | 4/2002 |
| WO | WO 2004/095365 | 11/2004 |

OTHER PUBLICATIONS

Supplemental European Search Report and Annex 04714417, Feb. 22, 2006.

\* cited by examiner

*Primary Examiner*—Michael G. Lee
*Assistant Examiner*—Allyson N Trail
(74) *Attorney, Agent, or Firm*—Slater & Matsil, L.L.P.

(57) ABSTRACT

According to some embodiments of the present invention, a multi-protocol non-volatile memory ("NVM") card may include a NVM array, at least two protocol units, and a controller adapted to provide an external application access to the NVM array with the use of one of the protocol units. The controller or control logic may select which protocol unit to use based on a signal or other indicator of the protocol used by the external application. According to some embodiments of the present invention, a method of operating a multi-protocol memory card may include switching between a first and a second protocol or mode of the card based on a signal from an application attempting to access to the NVM card.

20 Claims, 7 Drawing Sheets

MULTI-PROTOCOL MEMORY CARD

RELATED APPLICATIONS

This application is a continuation of U.S. patent application Ser. No. 10/372,304 filed Feb. 25, 2003, now abandoned.

FIELD OF THE INVENTION

The present invention relates generally to non-volatile memory cards and methods for operation thereof and, more particularly, to multi-mode operation of non-volatile memory cards.

BACKGROUND OF THE INVENTION

The operation of mass media non-volatile memory ("NVM") cards is well known. Various NVM mass storage devices able to handle large data files such as smart media cards, MultiMediaCards, memory sticks, and other like NVM mass storage devices and cards have been gaining market acceptance over the past several years. Hereinbelow, the term MultiMediaCard ("MMC"), or the like, refers to any NVM mass storage device able to handle large data files regardless of the protocol used. To date, the above NVM cards have been used for consumer applications such as digital cameras and portable music devices. Due to the absence of an agreed upon security standard for the above mentioned NVM card standards, none have been approved by any industry (e.g. banking, telecom, etc.) for the storage of private data such as bank details or telephone account information.

A category of NVM cards known as "smart-cards," having generally smaller capacity than the above mentioned mass storage devices, which work with secured application such as "smart card applications," have been known and adopted for commercial use by several industries including banking and telecommunications. Hereinbelow, the term "smart-card applications" refers to all secured applications known which relate or conform to the interoperability standard defined by the International Standards Organization (ISO) as the ISO 7816 standard for integrated circuit cards with contacts, or with any other secure standard. The specifications of the ISO 7816 standard, and any other standards which may relate thereto, focus on interoperability of secured applications over the physical, electrical, and data-link protocol levels.

There is a broad base of smart-card applications already on the market, and the need for secured applications in general is growing. Banks and credit institutions, for example, have defined an industry-specific smart card specification. This specification adopted the ISO 7816 standards and defined some additional data types and encoding rules for use by the financial services industry. This industry standard is called the EMV (Europay-MasterCard-Visa) standard. The ISO 7816 standard has also been adopted by the telecommunication industry, for use with the global system for mobile communications (GSM), to enable identification and authentication of mobile telephone users.

Due to the ISO 7816 standards, as well as the specifications that have adopted it, smart card applications and other ISO 7816 compliant applications currently operate only on an ISO 7816 communication protocol, for the most part using I/O, clock (CLK), and reset (RST) lines to store and retrieve data from a smart-card chip which us usually integrated within a smart-card controller of a protocol unit.

SUMMARY OF THE INVENTION

According to some embodiments of the present invention, a multi-protocol non-volatile memory ("NVM") card may include a NVM array, at least two protocol units, and a controller adapted to provide an external application access to the NVM array with the use of one of the protocol units. The controller or control logic may select which protocol unit to use based on a signal or other indicator of the protocol used by the external application.

As part of the present invention, there may be a method of operating a multi-protocol NVM card. According to some embodiments of the present invention, a method of operating a multi-protocol memory card may include switching between a first and a second protocol mode of the card based on a signal from an application attempting to access to the NVM card.

According to a further embodiment of the present invention, there may be an interface and a method of operating the interface, where the interface is between an external application substantially compliant with the ISO 7816 standard and a multi-protocol memory card. The interface may include a first connector to the external application and a second connector to the multi-protocol memory card. An interface according to some embodiments of the present invention may also include a signaling structure to indicate to the multi-protocol memory card to operate in a mode substantially compliant with the ISO 7816 standard.

BRIEF DESCRIPTION OF THE DRAWINGS

Aspects of the present invention may best be understood by reference to the following detailed description when read with the accompanying drawings, in which.

Figure 1:
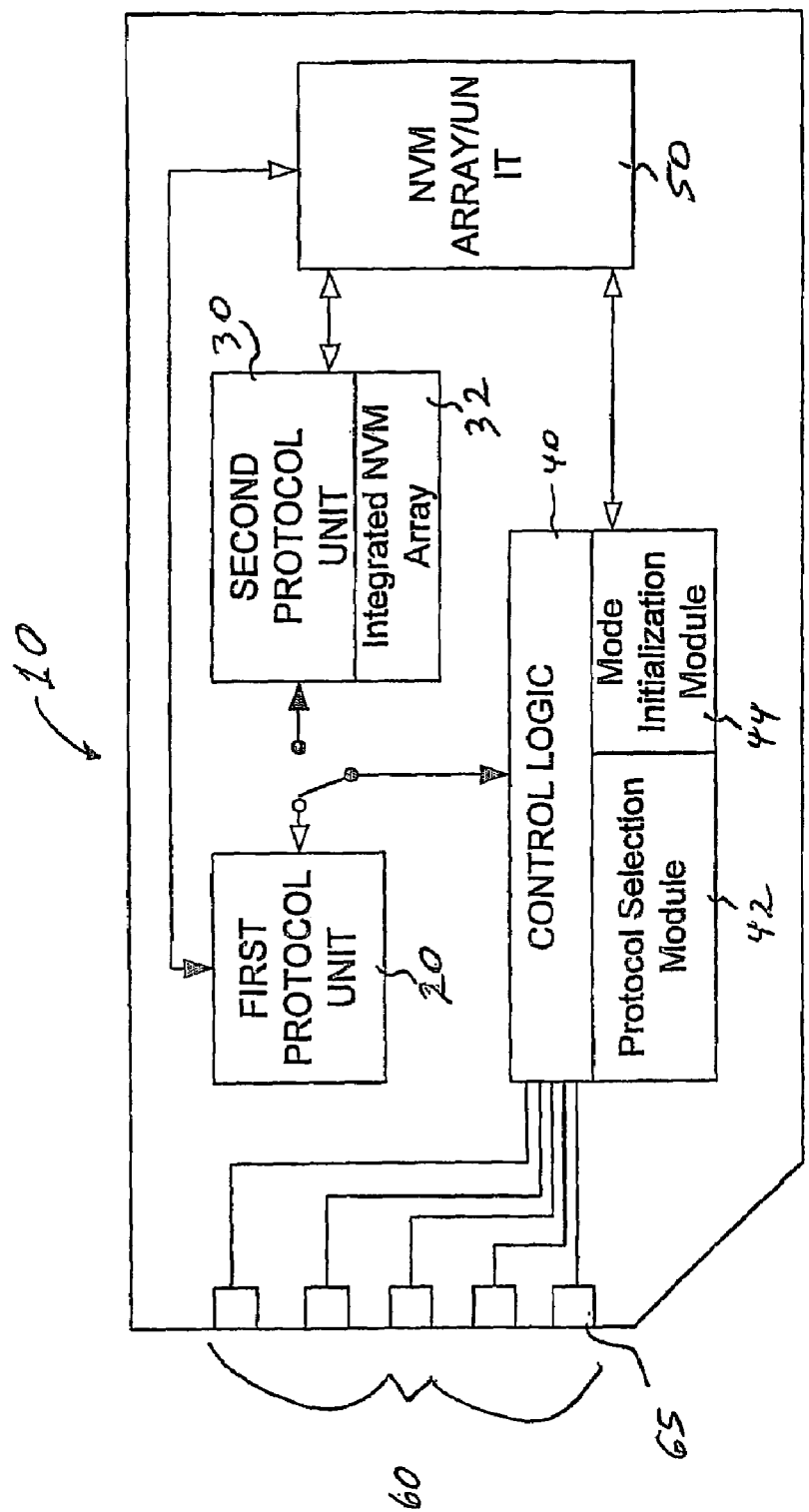
FIG. 1 is a block diagram illustration of a multi-protocol memory card, operative in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, and components have not been described in detail so as not to obscure the present invention.

According to some embodiments of the present invention, a multi-protocol non-volatile memory ("NVM") card may include a NVM array, at least two protocol units, and a controller or control logic adapted to provide an external application access to the NVM array using one of the protocol units. The controller or control logic may select which protocol unit to use based on an indicator of the protocol used by the external application.

As part of the present invention, there may be a method of operating a multi-protocol NVM card. According to some embodiments of the present invention, a method of operating a multi-protocol memory card may include switching between a first and a second protocol mode of the card based on a signal from an application attempting to access to the NVM card.

According to a further embodiment of the present invention, there may be an interface and a method of operating the interface, where the interface is between an external application substantially compliant with the ISO 7816 standard and a multi-protocol memory card. The interface may include a first connector to the external application and a second connector to the multi-protocol memory card. An interface according to some embodiments of the present invention may also include a signaling structure to indicate to the multi-protocol memory card to operate in a mode substantially compliant with the ISO 7816 standard.

As part of some embodiments of the present invention, there may be an implementation on a single memory card having a first protocol unit, for example a MultiMediaCard ("MMC") protocol unit, and a second protocol unit, for example an ISO 7816 memory card protocol unit. According to some embodiments of the present invention, a single NVM card may enable different applications, where each application uses different protocols, to operate on and access an NVM on the same NVM card.

Reference is now made to FIG. 1, which is a block diagram illustration of a multi-protocol memory card 10, operative in accordance with some embodiments of the present invention. Memory card 10 may include at least two protocol units, a first protocol unit 20 and a second protocol unit 30, as well as a controller 40 or control logic unit 40, and an NVM array 50 or NVM unit 50.

Either or both of the protocol units 20 and 30, may conform to a standardized protocol known in the art, for example; (1) MMC protocol, (2) ISO 7816—smart card protocol, (3) memory stick protocol, etc. Any one of the protocols associated with one or more protocol units may include a security or encryption feature. One or more of the protocol units 20 and 30, may include an integrated NVM array 32. For example, according to the ISO 7816 smart card standard, an ISO 7816 compliant smartcard may have an integrated controller unit, i.e. protocol unit, and integrated NVM array.

A multi-protocol NVM card according to some embodiments of the present invention may include an internal communication bus, which communication bus may allow the control logic 40 to communicate with either of the protocol units 20 or 30, and which may allow either of the protocol units to access the NVM unit 50, either directly or through the controller 40. Connector pins 60 may connect the controller 40 and internal bus to an external application. One or more of the connector pins, e.g. 65, may be used to indicate to the control logic 40 which protocol unit may communicate with an external application attempting to access the card.

Controller or control logic 40 may include a protocol selection module 42 and a mode initialization module 44. Protocol selection module 42 may determine, based on signals from an external application, in which protocol mode the card should be operating and may signal internal switching circuits to activate the appropriate protocol unit. Herein, signals may be software/firmware and/or hardware generated. Mode initialization module 44 may initialize or condition the logic state of the NVM card 10 in order to produce an internal logic state corresponding to an NVM card of the desired protocol.

The various portions of a multi-mode NVM card according to some embodiments of the present invention may be implemented on separate substrates (e.g. semi-conductor chips or cards), may be fabricated on the same substrates, or may be implemented in any combination. For example, according an embodiment of the present invention, the first protocol unit 20 and the logic unit 40 may be implemented on the same substrate. In a further embodiment of the invention, the second protocol unit 30 and logic unit 40 may be implemented on the same substrate. In yet a further embodiment of the invention, memory unit 50 and the second protocol unit 30 may be implemented on the same substrate. Many other combinations will be obvious to a person of ordinary skill in the art and are within the scope of the present invention.

The first protocol unit 20 may be implemented in any manner known in the art. For example, in a non-limiting embodiment of the present invention, it may be implemented as an MMC protocol unit, which protocol unit may be part of an MMC controller commercially available today. Memory unit 50 may also be implemented in any manner known in the art. It may be implemented, in a non-limiting embodiment of the present invention, as an NROM memory array or unit, for example.

Figure 2:
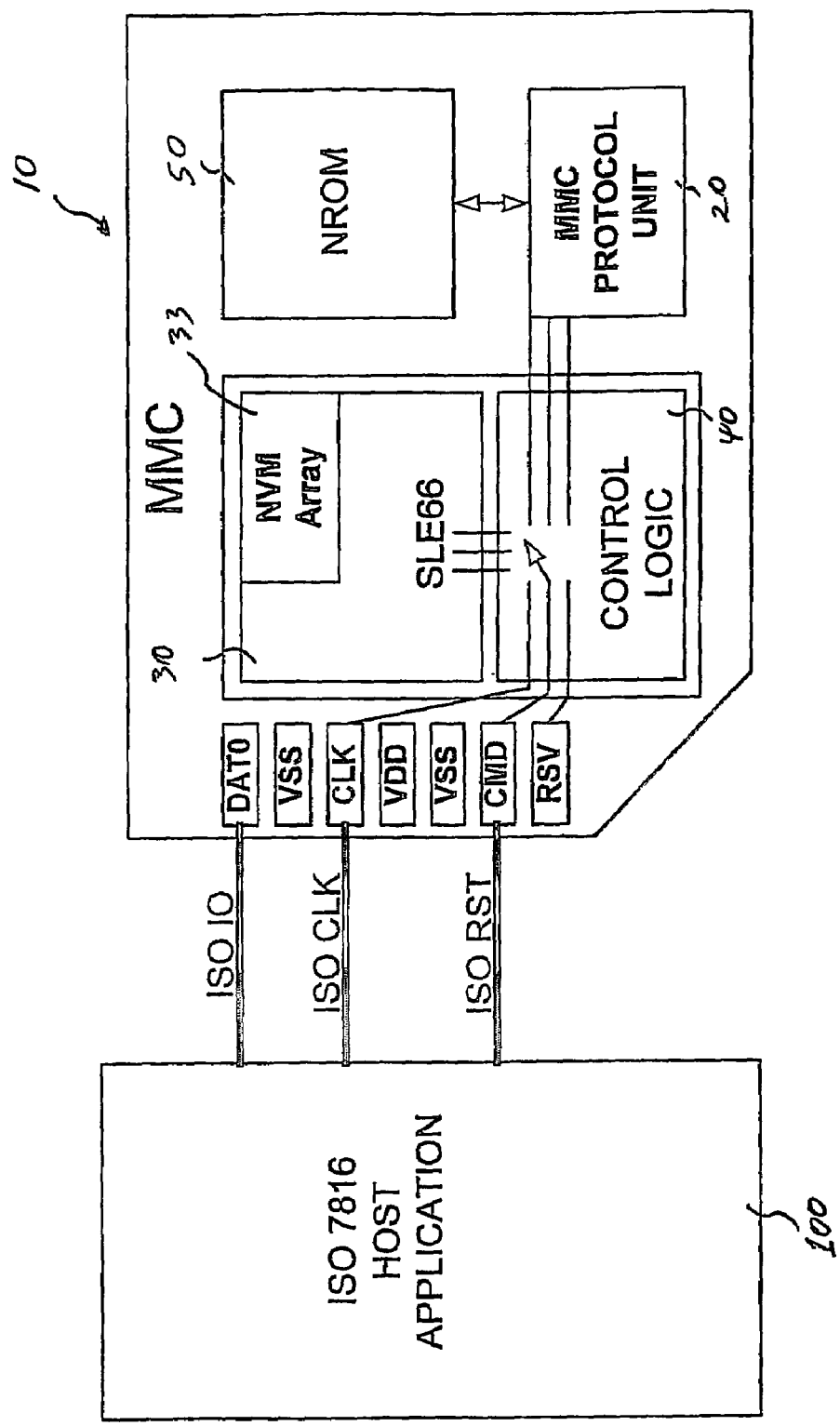
FIG. 2 is a block diagram illustration of some embodiments of the multi-protocol memory card of FIG. 1, where the card is adapted to operate in either an ISO 7816 protocol mode or in an MMC protocol mode.

Turning now to FIG. 2, there is shown a block diagram illustration of some embodiments of the multi-protocol memory card of FIG. 1, where the card is adapted to operate in either an ISO 7816 protocol mode or in an MMC protocol mode. Multi-protocol memory card 10 may include a first protocol unit 20 and a second protocol unit 30, which second protocol unit may be ISO 7816 complaint. According to some embodiments of the present invention, first protocol unit 20 may be a MultiMediaCard protocol unit, a SecureDigital protocol unit, a CompactFlash protocol unit, a Memory Stick protocol unit, and a non-volatile mass memory card protocol unit. Hence, the first protocol unit 20 may be any MMC controller available on the market today. According to some embodiments of the present invention, the second protocol unit 30 may be a smart card controller, for example, an Infineon™ SLE66 smartcard controller (available from Infineon Technologies Flash Ltd., Netanya, Israel) with an integrated NVM array 32. The control logic 40 may either be an ASIC ("application specific integrated circuit") or a modified portion of either an ISO 7816 or an MMC compliant controller.

FIG. 2 shows an ISO 7816 compliant host application 100 (e.g. banking application) communicating with the multi-protocol NVM using a data line, a clock line, and a reset line. The control logic 40, having identified that the application is an ISO 7816 application, may connect, either directly or through an external switch (not shown), the signals or lines from the ISO 7816 host application to the second protocol unit 30. Had the control unit 40 or control logic 40 identified the application attempting access to be an MMC application, the control logic 40 may have connected the relevant lines or signals from the application to the MMC protocol unit 20, either directly or through an external switch or multiplexer ("MUX"). For example, in an embodiment of the present invention, the reserved pin of the ISO 7816 standard may be used.

Figure 3:
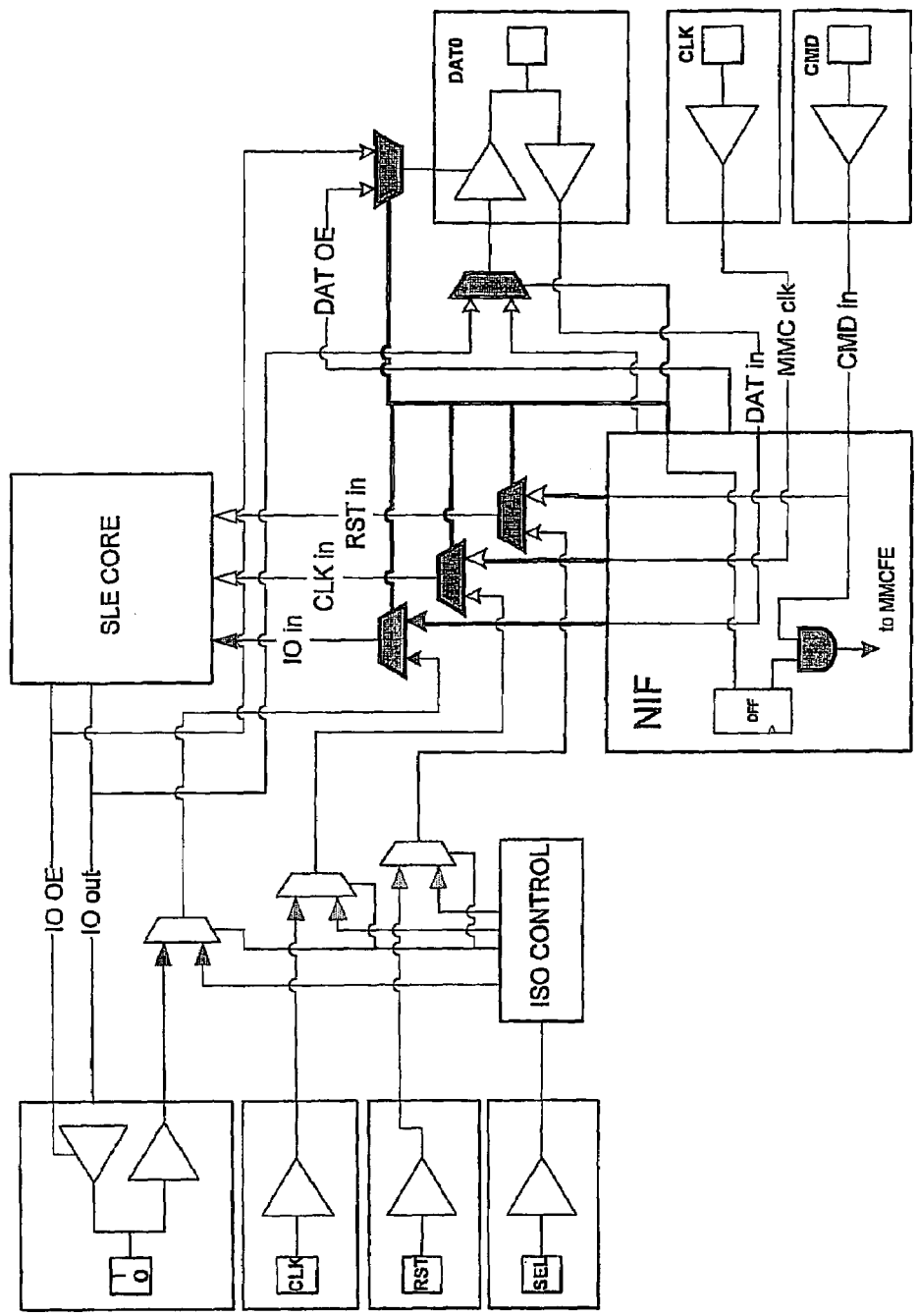
FIG. 3 is a more detailed block diagram of the card of FIG. 2, including details regarding possible logic circuit arrangements according to some embodiments of the present invention.

Turning now to FIG. 3, there is shown a more detailed block diagram of the card of FIG. 2, including some details regarding possible logic circuit arrangements according to some embodiments of the present invention. One set of pins 60A may be used to communicate with an ISO 7816 application, while a second set of pins 60B may be used to communicate with an MMC application. A select pun may receive a signal indicating whether an application attempting to access the card 10 is either an ISO 7816 or MMC application. Pins 60A and 60B may be two partially overlapping sets of pins.

An ISO controller 40 may be adapted to accept a protocol indicator signal from pin 65 and to either connect pin set 60A to the second protocol unit 30 (i.e. SmartCard Controller) or to connected pin set 60B to the first protocol unit 20 (MMC). One or more switches/multiplexers 70 may be used to switch internal signal paths in a multi-protocol card 10 according to some embodiments of the present invention.

Figure 4:
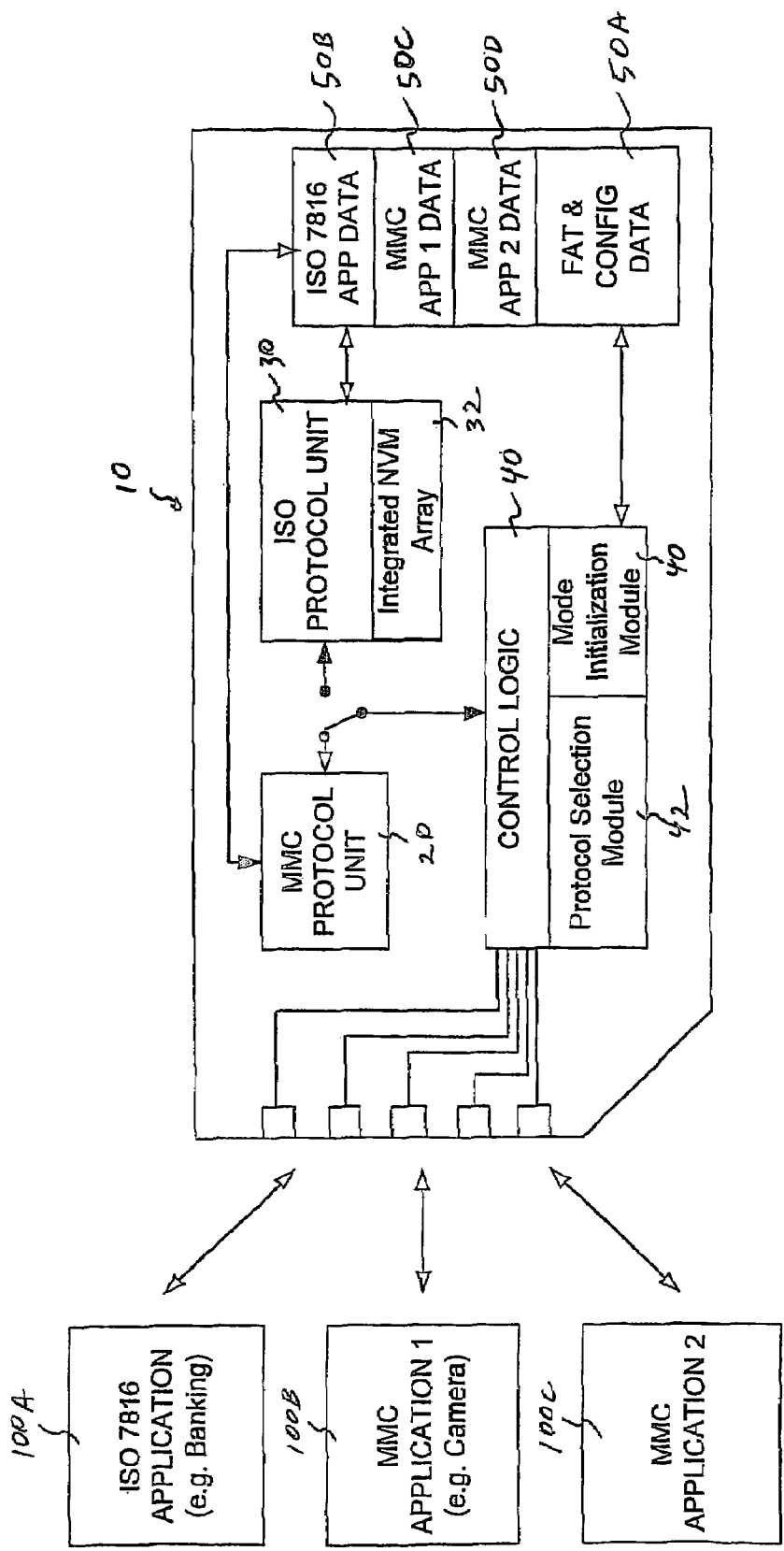
FIG. 4 is a block diagram showing the multi-protocol card of FIG. 1, wherein the NVM array of the card has been partitioned for use by each of three external applications, in accordance with some of the embodiments of the present invention.

Turning now to FIG. 4, there is shown a block diagram of the multi-protocol card of FIG. 1, wherein the NVM array of the card has been partitioned for use by each of three external applications, in accordance with some of the embodiments of the present invention. The control logic 40 according to some embodiments of the present invention may produce a file allocation or application allocation table 50A of the NVM array 50. The allocation table 50A may allow several applications to share space on the NVM array. When a particular application attempts to access the card, the control logic 40 may use the allocation table 50A to determine to which physical portions of the NVM array to grant access.

According to the example of FIG. 4, an ISO 7816 compliant application 100A may either access an integrated NVM array 32 on a second protocol unit 30, or may access a portion of the NVM array 50B set aside for ISO 7816 compliant use, also using the second protocol unit 30. Each of two MMC applications 100B and 100C may access NVM array portions 50C and 50D through the control logic 40 and first (i.e. MMC) protocol unit 20.

The partitioning of a fixed amount of memory into separate files or memory segments associated with different applications is well known. Any technique known today or to be devised in the future is applicable to the present invention.

Figure 5:
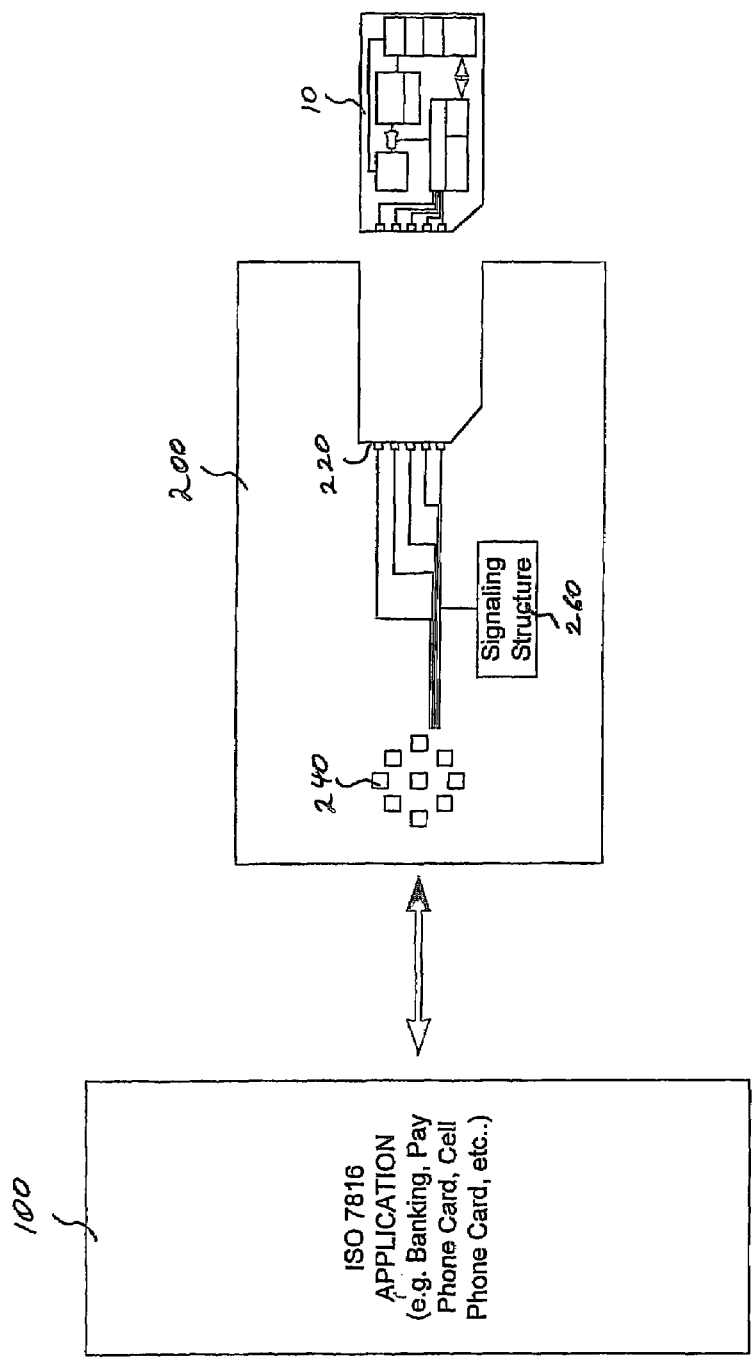
FIG. 5 is a block diagram showing a card according to any of FIGS. 1 through 4, or any other multi-protocol card, communicating with an ISO 7816 external application through an interface according to some embodiments of the present invention.

Turning now to FIG. 5, there is shown a block diagram of a card according to any of FIGS. 1 through 4, or any other multi-protocol card, communicating with an ISO 7816 external application 100 through an interface 200 according to some embodiments of the present invention. An interface according to some embodiments of the present invention may have a first set of connecting pins 240 to connect to an external application such as an ISO 7816 compliant application, and a second set of pins 220 to connect a multi-protocol card according some embodiments of the present invention. The first set of pins may be physically configured to engage with a host application such as an ISO 7816 compliant banking or telecommunications application. Since a multi-protocol card 10 according to some embodiments of the present invention may have any one of several physical configurations and dimensions, including those of an MMC card, a smart media card, a memory stick, etc., the second set of pins may be configured to engage with the specific embodiment of the card. The example of an interface shown in FIG. 5 is that of an interface between an ISO 7816 compliant application and a multi-protocol card having a configuration and size of an MMC card.

The interface 200 may include wiring to connect signals from the first set of connecting pins 240 to the second set of connecting pins 220. The wiring may be adapted to map the signals sent by the application 100 to the appropriate corresponding pins on the card 10. A signaling structure 260 may produce a signal, which may indicate to the multi-protocol card 10 to switch to a mode or protocol corresponding to the protocol associated with the host application 100. In some embodiments of the present invention, the signaling structure is a signal source, while in other embodiments of the present invention, the signaling structure may be little more than a conductor or jumper which may connect two or more pins on the card 10.

Figure 6:
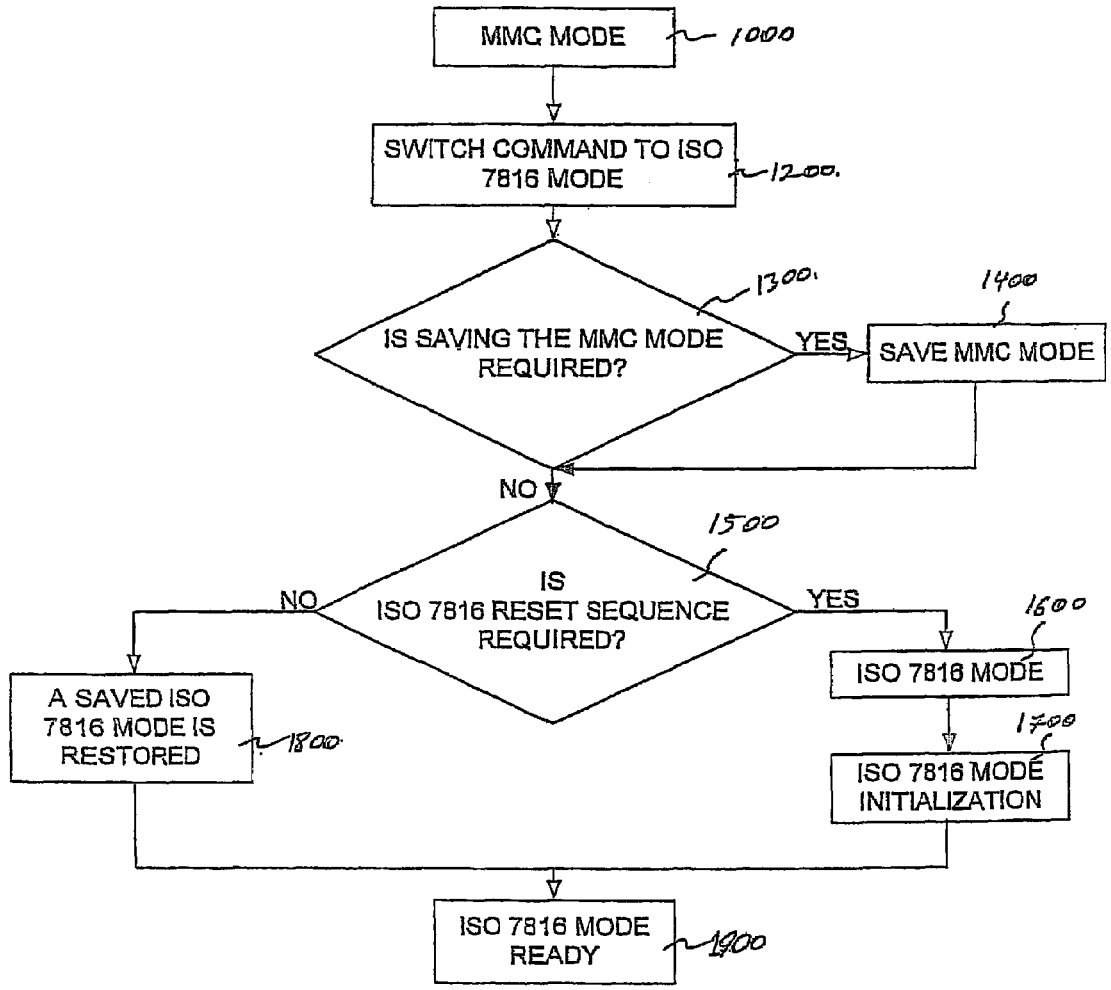
FIG. 6 is a flow chart illustration of a method by which a multi-protocol card may switch from a first protocol mode (e.g. MMC mode) to a second protocol mode (e.g. ISO 7816 mode) in accordance with some embodiments of the present invention.

Reference is now made to FIG. 6, which is a flow chart illustration of a method that may be performed to switch a multi-protocol card according to some embodiments of the present invention from a first protocol mode, for example an MMC mode, to a second protocol mode, for example an ISO 7816 compliant mode. The method may be performed by a controller or control logic 40 operative in accordance with an embodiment of the present invention.

The description hereinbelow will use an exemplary non-limiting implementation with reference to the multi-protocol card 10 of FIGS. 1 and 2. Memory card 10 may start in an MMC compliant mode (phase 1000). The card's control logic or controller 40 may be using an MMC protocol unit to communicate with an MMC application, or may simply keep the MMC protocol unit online while in idle mode. Phase 1200 may be prompted upon receiving an indication or signal from an external application requiring the card 10 to be in ISO 7816 mode. According to Phase 1200, an internal switching command to switch to ISO 7816 mode may be sent. Before the switching occurs, a check may be done to determine whether the card's current MMC mode details (e.g. configuration, files, etc.) should be saved (phase 1300). If so, at phase 1400 the current MMC compliant details may be saved to a NVM array within the card. Part of the NVM array may contain a memory segment for storing file allocation and card configuration data. If details do not need to be saved, phase 1400 may be skipped.

Following phases 1300 and 1400, as part of phase 1500, in setting up the second protocol mode, it may be determined whether an ISO 7816 compliant mode reset sequence is required. If a reset sequence is not required, an ISO 7816 compliant mode may be established (phase 1600), and at phase 1700 an ISO 7816 compliant mode may be initialized.

If a reset sequence is required, restoration of a previously saved ISO 7816 compliant mode may be performed as part of phase 1800. The mode may be restored based on data stored in an NVM array.

At phase 1900, which may follow either phase 1700 or phase 1800, an ISO 7816 mode may be operational.

Figure 7:
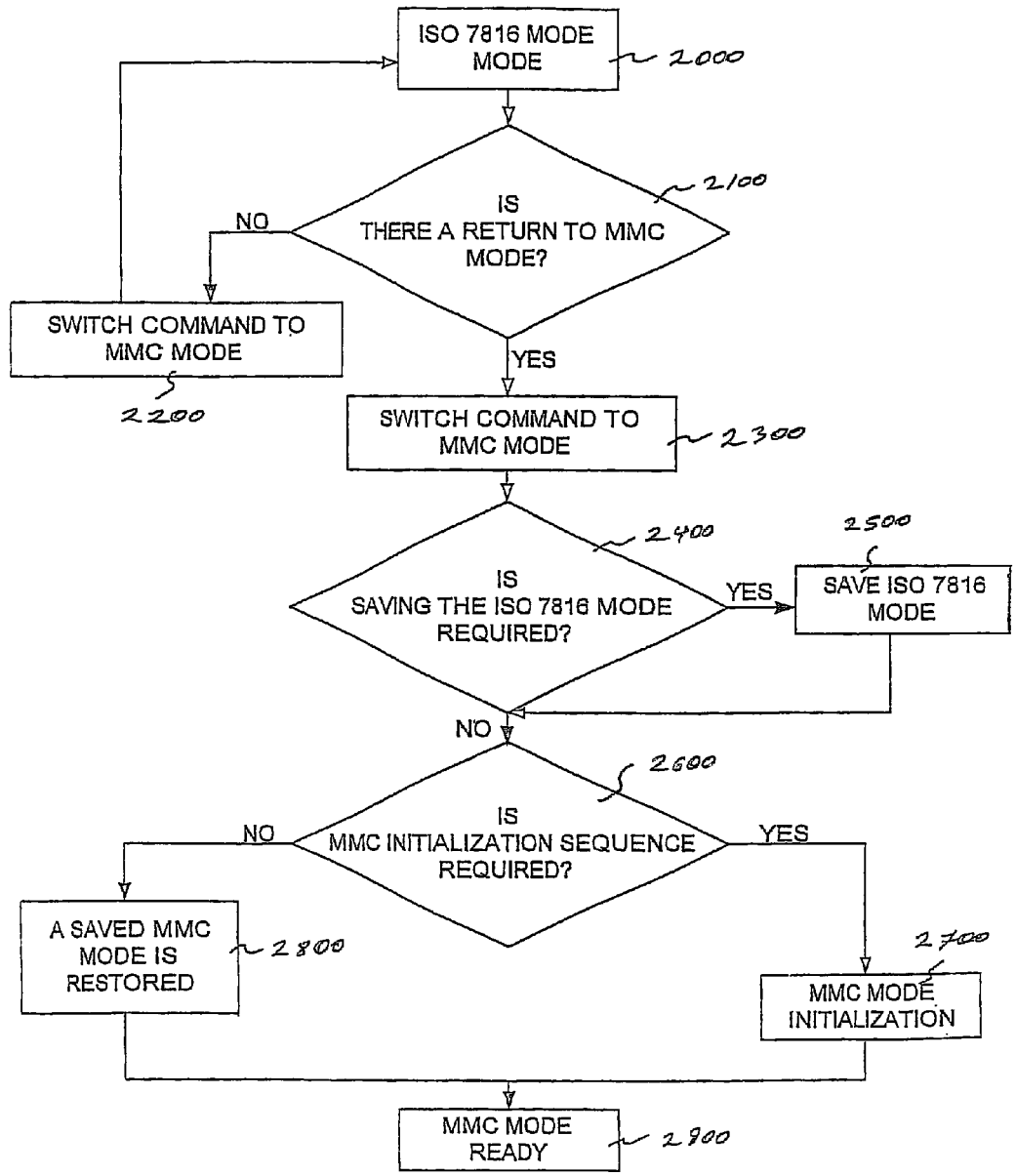
FIG. 7 is a flow chart illustration of a method by which a multi-protocol card may switch from a second protocol mode (e.g. ISO 7816 mode) to a first protocol mode (e.g. MMC mode) in accordance with some embodiments of the present invention.

Reference is now made to FIG. 7, which is a flow chart illustration of a method that may be performed in accordance with some embodiments of the present invention to switch a multi-protocol NVM card according to an embodiment of the present invention from an ISO 7816 compliant protocol mode to an MMC protocol compliant mode. A memory card 10 according to any one of FIGS. 1 through 5 may start in an ISO 7816 compliant mode (phase 2000). A check may be performed so as to determine whether a switch to an MMC protocol compliant mode may be executed (phase 2100). Mode switching from ISO 7816 mode to MMC protocol mode may be executed in many ways, including but not limited to by a command that may be executed from host 100 to memory card 10, by sending signals through ISO 7816 connector pin 65, or by other signal lines. Under some conditions, a switch from ISO 7816 mode to MMC mode may not be executed (phase 2200) and, therefore, memory card 10 may remain in ISO 7816 compliant mode. It may, however, be operated in MMC mode in other circumstances, including, but not limited to, after power up of memory card 10. A switching command to MMC mode may be sent (phase 2300). A check may then be made as to whether the current ISO 7816 compliant mode should be saved (phase 2400). If so, at phase 2500, the current ISO 7816 compliant mode may be saved.

A check, which may follow phase 2400 or phase 2500, is made as to whether in setting up the second protocol mode, an MMC mode initialization sequence is required (phase 2600). If an initialization sequence is required, an initialization of MMC mode may be executed (phase 2700). When an initialization sequence is not required, a previously saved MMC mode may be restored (phase 2800). A saved MMC mode may be restored if, during a previous session, an MMC mode was saved, e.g. phase 1400, FIG. 6. At phase 2900, a card's MMC mode may be operational.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A multi protocol non-volatile memory non-volatile memory ("NVM") card comprising:
    an NVM unit;
    at least two protocol units, at least one of said protocol units having access to said NVM unit, wherein said at least two protocol units comprise a first protocol unit operable in a first protocol mode, and a second protocol unit operable in a second protocol mode; and
    a logic unit to select one of said at least two protocol units, wherein said logic unit is configured to switch from the first to the second protocol unit based on a signal from an application seeking access to the NVM card, wherein the logic unit is configured to switch from the first to the second protocol unit by commanding the NVM memory card to switch to the second protocol mode, and to set up the second protocol mode by restoring a previous card state.

2. The memory card according to claim 1, wherein said second protocol unit substantially conforms to the ISO 7816 standard.

3. The memory card according to claim 2, wherein said second protocol unit comprises an integrated non-volatile memory array.

4. The memory card according to claim 2, wherein said first protocol unit is selected from the group consisting of a MultiMediaCard protocol unit, a SecureDigital protocol unit, a CompactFlash protocol unit, a Memory Stick protocol unit, and a non-volatile mass memory card protocol unit.

5. The memory card according to claim 1, wherein said NVM unit, said at least two protocol units, and said logic unit are on a single substrate.

6. The memory card according to claim 1, wherein said first and second protocol units are on separate substrates.

7. The memory card according to claim 1, wherein said logic unit selects a protocol unit based on an external signal indicating a protocol used by a host application.

8. The memory card according to claim 7, wherein said second protocol unit is selected if the host application substantially conforms to the ISO 7816 standard.

9. The memory card according to claim 8, wherein said second protocol unit grants the host application access to said integrated non-volatile memory array.

10. The memory card according to claim 7, wherein said first protocol unit is selected if the host application does not substantially conform to the ISO 7816 standard, and said first protocol unit grants the host application access to the NVM unit.

11. A method of operating a multi protocol NVM card, the method comprising:
    switching between a first and a second protocol mode based on a signal from an application seeking access to the NVM card, wherein said switching from the first to the second protocol modes comprises:
        commanding the NVM memory card to switch to the second protocol mode, and
        setting up the second protocol mode, wherein said setting up comprises restoring a previous card state.

12. The method according to claim 11, wherein said commanding comprises activating a physical switch.

13. The method according to claim 11, wherein said commanding comprises sending a firmware command.

14. The method according to claim 11, wherein said commanding comprises activating a second protocol unit.

15. The method according to claim 11, wherein said setting up comprises performing an initialization sequence.

16. The method according to claim 11 further comprising saving the current card state.

17. The method according to claim 11, wherein switching from the second protocol mode to the first protocol mode comprises:
    commanding the NVM memory card command to switch to the first protocol mode;
    and setting up the first protocol mode.

18. The method according to claim 17, wherein said commanding comprises activating a physical switch.

19. The method according to claim 17, wherein said commanding comprises sending a firmware command.

20. The method according to claim 11, wherein said second protocol mode substantially conforms to the ISO 7816 standard and before the NVM card switches from the second protocol mode to the first protocol mode, a determination is made whether such a switch is possible.

* * * * *

UNITED STATES PATENT AND TRADEMARK OFFICE
CERTIFICATE OF CORRECTION

PATENT NO.        : 7,641,121 B2                                     Page 1 of 1
APPLICATION NO. : 10/546938
DATED             : January 5, 2010
INVENTOR(S)       : Krygier et al.

It is certified that error appears in the above-identified patent and that said Letters Patent is hereby corrected as shown below:

In Col. 7, line 44, claim 1, delete first occurrence of "non-volatile memory".
In Col. 7, line 57, claim 1, delete "NVM memory card" and insert --NVM card--.
In Col. 8, line 14, claim 7, delete "claim 1" and insert --claim 3--.
In Col. 8, line 34, claim 11, delete "NVM memory card" and insert --NVM card--.
In Col. 8, line 51, claim 17, delete "NVM memory card" and insert --NVM card--.

Signed and Sealed this

Thirteenth Day of July, 2010

David J. Kappos
*Director of the United States Patent and Trademark Office*